2,833,746

Patented May 6, 1958

2,833,746

ACRYLONITRILE-ISOBUTYLENE-STYRENE INTERPOLYMER

Albert J. Haefner, Baton Rouge, La., assignor to Ethyl Corporation, New York, N. Y., a corporation of Delaware No Drawing. Application December 23, 1953
Serial No. 400,135

3 Claims. (Cl. 260—80.5)

This invention relates to organic polymers and more particularly to an interpolymer suitable for moldings, films, fibers and similar materials.

Copolymers of acrylonitrile and styrene are manufactured commercially and are described in U. S. Patent No. 2,102,179. Although these copolymers have many desirable properties, certain of their physical properties, particularly impact strength and flexural strength leave much to be desired. Attempts have been made to improve these acrylonitrile-styrene copolymers by blending the same with quantities of nitrile rubber (butadiene-acrylonitrile) to improve the impact strength and other properties thereof. However, while this blending does improve somewhat their impact strength properties, the resulting product has an impaired clarity, gloss and other deficiencies which spoil their appearance and, in addition, the product has vastly lower tensile and flexural strengths than the unblended copolymer. The latter properties of the blended product are very poor. The blended polymers are also inferior due to their tendency to deteriorate with weathering, particularly through oxidation.

It is accordingly an object of this invention to provide an improved plastic material. It is a further object to provide a polymer which has improved strength properties, particularly flexural and impact strength. Still another object of the invention is to provide a polymer of the above type which possesses good clarity, gloss, and other esthetic properties. Another object is to provide a polymer adapted to be manufactured from relatively inexpensive monomers and which is resistant to a wide range of organic solvents and other media.

This invention comprises a tripolymer of acrylonitrile, styrene and isobutylene having an extremely high flexural strength, generally above about 12,000 p. s. i. and preferably above about 15,000 p. s. i. The invention is based upon the surprising discovery that the properties of acrylonitrile-styrene copolymers or copolymers of derivatives of these monomers can be materially improved by copolymerization thereof with isobutylene providing the amount of isobutylene employed is maintained within certain limits, preferably no greater than 30 weight percent based on the weight of the final tripolymer. Considered from a different viewpoint, the substitution of styrene for part of an acrylonitrile-isobutylene copolymer materially increases the impact and flexural strengths of the product, even though styrene is generally believed to have poor impact and flexural strengths itself. Thus, the properties of the resulting tripolymers are unexpectedly better than copolymers of any two of these monomers, i. e., acrylonitrile-styrene, acrylonitrile-isobutylene, or styrene-isobutylene. Moreover, in contrast to the teachings of the above Patent No. 2,102,179, quantities of acrylonitrile above 5 percent by weight do not impair the impact strength of the resulting tripolymer, but, in fact, polymers containing higher concentrations of acrylonitrile actually have improved impact strengths. The flexural strength of the tripolymers of this invention is most exceptional, and is at least as good or better than any non-reinforced polymer presently known, regardless of its monomeric constituency. Of even greater importance is the combination in the same polymer of both exceptionally high in flexural strength and high impact strength. No polymer is known having this desirable combination of properties.

It has previously been proposed to prepare ternary mixtures of polymers by incorporating additional monomers in copolymers formed of isobutylene and acrylonitrile. For example, U. S. Patent 2,537,636 which is directed primarily to copolymers of isobutylene and acrylonitrile, suggests the inclusion of methyl methacrylate or butadiene-1,3 to form a ternary composition. This patent also mentions the possible use of styrene for this purpose. In contrast to the present invention, however, all of the examples given in this patent employ a high isobutylene charge, the lowest concentration of isobutylene in any of the mixtures being 34 percent. As indicated above, it has now been found that high concentrations of isobutylene in the charge invariably results in a low molecular weight product having poor strength characteristics. The maximum molecular weight of any of the polymers given in this patent is 74,000 which is too low to yield a plastic material consisting of these components having flexural strengths above 12,000 p. s. i. In contrast to this, the tripolymers comprising the present invention possess flexural strengths generally above 12,000 p. s. i. and preferably above about 15,000 p. s. i. Thus, by means of the applicant's invention, it is possible to prepare polymers possessing both high flexural and impact strengths, a combination of properties heretofore not realized in any known polymer.

The concentration of the three components of the polymer of this invention can vary over wide ranges, while still obtaining a product having flexural strengths above about 12,000 p. s. i. and improved impact strength. However, variations in the proportions of the various monomers somewhat vary the specific properties of the resulting polymer. In general, the acrylonitrile concentration in the polymer can vary between about 5–90 percent by weight, based upon the weight of the final tripolymer, although it is preferred to have a concentration of between about 40–80 percent. The concentration of the styrene can range between about 2–70 percent by weight but a more preferred concentration is between about 5–45 percent. The isobutylene should be present in the tripolymer in a concentration range between about 2–30 weight percent. However, a range in concentration of between about 10–30 percent is preferred. It is to be understood that the above limits refer to the concentration of the monomers in the final tripolymer, but it may be necessary to charge somewhat different proportions of monomers during the polymerization operation.

The following is a table of different tripolymers which illustrates the present invention:

TABLE

| Polymer No. | Percent by Weight | | |
|---|---|---|---|
| | Acrylonitrile | Styrene | Isobutylene |
| 1 | 59 | 15 | 25 |
| 2 | 51 | 30 | 19 |
| 3 | 20 | 73 | 7 |
| 4 | 36 | 49 | 15 |
| 5 | 61 | 10 | 29 |
| 6 | 36 | 51 | 13 |
| 7 | 47 | 30 | 23 |
| 8 | 59 | 11 | 30 |
| 9 | 16 | 64 | 20 |
| 10 | 80 | 11 | 9 |

The polymerization of the tripolymer of this invention can be carried out by a free radical type process and can be effected by any suitable technique, including solution, emulsion bulk or suspension. Also, the polymerization can be carried out by either a batch or a continuous process, depending largely on the economics of the operation.

The new tripolymers of this invention can be polymerized using any suitable initiator, such as peroxides, hydroperoxides, persulfates, percarbonates, peroxy acids, and diazo compounds. Typical specific examples of suitable chemical initiators are benzoyl peroxide, t-butyl hydroperoxide, di-isopropylbenzene monohydroperoxide, acetyl peroxide, di-t-butyl peroxide, $\alpha,\alpha'$-azo-bis-isobutyronitrile, potassium peroxide, p-methane hydroperoxide, lauroyl peroxide, acetyl benzoyl peroxide, succinyl peroxide, peracetic acid, m-bromobenzoyl peroxide, zinc peroxide, persuccinic acid, perchlorates, urea peroxide, dialkyl peroxy dicarbonate, ascaridole, cyclohexanone peroxide, alkaline earth metal persulfates, perborates, nitric acid, manganese dioxide, tetraphenyltin, tetraethyllead, and Grignard-type compounds.

The catalyst concentration for the polymerization can vary over a wide range. A suitable concentration is between about 0.001 to about 10 mole percent, based upon the total concentration of the monomer or monomers. Normally, catalytic quantities are desirable. The concentration preferably should be between about 0.1 to 2 percent by weight. These desired concentrations vary somewhat with different activators and when catalyst mixtures are employed.

The temperature of the polymerization is important but not critical. Such reactions can be carried out, for example, between about $-50°$ and $200°$ C. depending upon the concentration or proportion of the monomers, and also upon the particular catalyst selected. A more preferred temperature range is between about $20°$ and $80°$ C. When employing catalysts such as acetyl peroxide, peracetic acid, isopropyl percarbonate and the like, temperatures of about $30°$ to $50°$ are preferred. When using lauroyl peroxide and benzoyl peroxide, somewhat higher temperatures are desirable, i. e., between about $60°$ and $80°$ C. When peroxides or other free radical catalysts which decompose at higher temperatures are employed, such for example as di-t-butyl peroxide, temperatures above about $100°$ C. are preferred.

In some cases, it has been found desirable to employ a reductant to activate the catalyst. Typical examples of suitable reductants are inorganic oxidizable sulfoxy compounds of the group consisting of sulfur dioxide, sodium bisulfite, sodium sulfite, ammonium bisulfite, sodium hydrosulfite, and sodium thiosulfate. The reductant can be used in a concentration of from about 0.001 percent to 5 percent based on the quantity of the monomer.

The quantity of water is not critical but sufficient aqueous emulsion medium is employed to provide a conveniently workable polymerization system. Normally, the aqueous medium is above about 75 percent and preferably above about 100 percent of the weight of the monomer to be polymerized. Greater quantities of emulsion medium can be employed but excessive quantities merely reduce the capacity of the polymerization equipment.

The emulsifying agents suitable for use in the above process are any of the well-known cationic, anionic and non-ionic types. Typical examples of emulsifying agents are naphthalenic soaps or sulfonates; sulfonation products of glycerides or their fatty acids; sulfonated derivatives of esters of mono- and polyvalent alcohols; esterification products of fatty acids and sulfonated monovalent alcohols; sulfonated derivatives of fatty acid esters, such as the diamyl or dioctyl esters of sodium sulfo succinic acid; sulfonation products of fatty amides, ketones, aldehydes, and nitriles; sulfonation products of natural and synthetic alcohols, such as alkyl sulfates and sulfonates; phosphoric and pyrophosphoric esters of fatty alcohols, such as the sodium salt of 2-ethyl hexyl phosphate; amino carboxylic acids; sulfonated aromatic hydrocarbons, such as the sodium alkyl aryl sulfates and sulfonates, alkylated aryl sulfonates; sulfonated and chlorosulfonated paraffin hydrocarbons; sulfated and sulfonated derivatives of nonionic compounds, such as the sodium alkyl aryl polyether sulfates and sulfonates; aliphatic amines and their derivatives; aromatic amines having fatty chains; fatty amides of aliphatic diamines; quaternary ammonium compounds (bases and halides), such as dimethyl phenyl benzyl ammonium chloride, decyl trimethyl ammonium chloride, dodecyl trimethyl ammonium chloride, tetradecyl trimethyl ammonium chloride, hexadecyl trimethyl ammonium chloride, octadecyl trimethyl ammonium chloride; amides derived from amino alcohols and their quaternary ammonium derivatives; basic compounds of pyridinium and its derivatives; polypropanol polyethanol amines; urethanes or basic salts of ethylene diamine; condensation products of fatty substances and their derivatives with ethylene oxide, such as the polyoxyalkylene ethers of partial lauric, palmitic, stearic, or oleic acid esters; and condensation products of phenolic compounds having side chains with ethylene oxide, such as the condensation product of dodecyl phenol with ethylene oxide.

The following are examples of polymerizations of tripolymers in accordance with the present invention. It is to be understood that these examples are merely illustrative and are not to be construed as in any way limiting the present invention.

*Example I*

To a glass polymerization vessel was added 200 parts by weight of distilled water and 6 parts of Triton X-301 (an alkyl aryl polyether sulfate emulsifying agent). This mixture was cooled in the polymerization vessel to about $-20°$ C. and 63 parts of acrylonitrile, 10 parts of styrene, and 27 parts of liquid isobutylene were added thereto. To this mixture was added one part of potassium persulfate and 0.2 part of sodium bisulfite, while maintaining the temperature of the mixture at about $-20°$ C. The vessel was closed, sealed, placed in a polymerization bath, and heated to $45°$ C. The mixture was maintained at this temperature for 72 hours and continuously agitated. The polymer was recovered by coagulation in a saturated sodium chloride solution, washed with water, and dried in a vacuum oven. Eight-eight (88) parts of a white polymer were recovered having an intrinsic viscosity in dimethyl formamide at $30°$ C. of 3.765. The polymer, by carbon, hydrogen, nitrogen analysis, contained 67 percent acrylonitrile, 6 percent styrene and 27 percent isobutylene. The above product was molded at $160°$ C. and 5,000 pounds per square inch to form a two-inch diameter disc. The disc had excellent gloss and was transparent. Impact tests were conducted using a falling ball technique, with a 27.65 gram steel ball. A measure of impact strength was made by dividing the height of fall of the ball by the thickness of the disc. The disc of this example had an impact strength of 511. This value is to be compared with a commercial acrylonitrile-styrene copolymer (15–85) which had a value of only 274. The flexural strength of the polymer was above 17,000 p. s. i.

*Example II*

Example I was repeated except that 42 parts of acrylonitrile, 18 parts of isobutylene, and 40 parts of styrene were added to the polymerization vessel and the product obtained contained 44 parts of acrylonitrile, 13 parts of isobutylene, and 43 parts of styrene. The product had an intrinsic viscosity of 2.974 and an impact strength of 543 using the test discussed in Example I. The product also had an exceptionally good flexural strength of 18,450 p. s. i.

Example III

Example I was repeated except that 64 parts of acrylonitrile, 20 parts of isobutylene, and 16 parts of styrene were charged to the polymerization vessel. The product contained 63 parts of acrylonitrile, 29 parts of isobutylene, and 8 parts of styrene. The impact strength of the molded product, using the test outlined in Example I, was 562. The flexural strength of the molded product was 17,930 p. s. i.

Each of the monomers acrylonitrile, isobutylene, and styrene can be manufactured by conventional means well known in the art. Commercial monomers are suitable for use in producing the tripolymer of this invention.

It will be apparent from the foregoing that the present invention provides a materially improved polymer composition which has exceptionally high flexural strength, making the same suitable for a wide variety of uses including molded products, sheeting, coatings, films, and structural articles. The product of this invention also has a very exceptional impact strength which in combination with the improved flexural strength makes the material very suitable for molded articles and structural forms. These combined properties also result in a product desirable as synthetic fibers for textile uses.

I claim:

1. A tough clear interpolymer having a high impact strength consisting essentially of between about 40–80 percent of acrylonitrile, between about 5–45 percent by weight of styrene, and between about 10–30 percent by weight of isobutylene, said polymer having a flexural strength above about 15,000 p. s. i.

2. The composition of claim 1 wherein the acrylonitrile concentration is about 45 percent.

3. A tough clear interpolymer having a high impact strength consisting essentially of about 44 percent by weight of acrylonitrile, about 13 percent by weight isobutylene, and about 43 percent by weight styrene, said polymer having a flexural strength above about 15,000 p. s. i.

References Cited in the file of this patent

UNITED STATES PATENTS 2,537,626    Eberly ---------------- Jan. 9, 1951